US010470355B2

(12) United States Patent
Renault et al.

(10) Patent No.: US 10,470,355 B2
(45) Date of Patent: Nov. 12, 2019

(54) SOWING ELEMENT EQUIPPED WITH AN OWN PNEUMATIC DEVICE AND PNEUMATIC SINGLE-SEED SOWING MACHINE HAVING AT LEAST ONE SUCH SOWING ELEMENT

(71) Applicant: KUHN SA, Saverne (FR)

(72) Inventors: Stephane Renault, Allenwiller (FR); Vincent Bach, Sarrewerden (FR); Bruno Edler Von Der Planitz, Dresden (DE); Wolfgang Aumer, Rettenbach (DE)

(73) Assignee: KUHN SA, Saverne (FR)

( * ) Notice: Subject to any disclaimer, the term of this patent is extended or adjusted under 35 U.S.C. 154(b) by 113 days.

(21) Appl. No.: 15/025,790

(22) PCT Filed: Sep. 29, 2014

(86) PCT No.: PCT/FR2014/052441
§ 371 (c)(1),
(2) Date: Mar. 29, 2016

(87) PCT Pub. No.: WO2015/044612
PCT Pub. Date: Apr. 2, 2015

(65) Prior Publication Data
US 2016/0212930 A1  Jul. 28, 2016

(30) Foreign Application Priority Data

Sep. 30, 2013 (FR) ...................... 13 59399

(51) Int. Cl.
*A01C 7/08* (2006.01)
*A01C 7/16* (2006.01)
*A01C 7/04* (2006.01)

(52) U.S. Cl.
CPC .............. *A01C 7/044* (2013.01); *A01C 7/081* (2013.01); *A01C 7/16* (2013.01); *A01C 7/046* (2013.01)

(58) Field of Classification Search
None
See application file for complete search history.

(56) References Cited

U.S. PATENT DOCUMENTS 3,888,387 A     6/1975  Deckler
3,999,690 A    12/1976  Deckler
5,333,559 A *  8/1994  Hodapp ................ A01B 49/06
                                                  111/152

(Continued)

FOREIGN PATENT DOCUMENTS

FR          1 229 027 A      9/1960
FR          2 730 712 A1     8/1996
WO    WO 2011/056138 A1      5/2011

OTHER PUBLICATIONS

International Search Report dated Jan. 28, 2015, in PCT/FR2014/052441 filed Sep. 29, 2014.

*Primary Examiner* — Christopher J. Novosad
(74) *Attorney, Agent, or Firm* — Oblon, McClelland, Maier & Neustadt, L.L.P.

(57) ABSTRACT

A seeding element including a tank configured to contain seeds, at least one planting device and at least one dispensing housing delivering the seeds, one by one, via a rotary dosing element, the seeds being dispensed pneumatically. A pneumatic single-grain seeder can include at least one of the seeding element.

18 Claims, 5 Drawing Sheets

(56) References Cited

U.S. PATENT DOCUMENTS

| | | |
|---|---|---|
| 2008/0264313 A1 | 10/2008 | Sauder et al. |
| 2009/0064910 A1 | 3/2009 | Chiavario et al. |
| 2010/0313802 A1 | 12/2010 | Sauder et al. |
| 2011/0054743 A1* | 3/2011 | Kocer .................. A01B 79/005 701/50 |
| 2011/0120356 A1 | 5/2011 | Wendte et al. |
| 2012/0042815 A1* | 2/2012 | Wonderlich ........... A01C 7/107 111/174 |
| 2012/0227648 A1* | 9/2012 | Kowalchuk ............ A01C 7/126 111/200 |
| 2012/0234220 A1 | 9/2012 | Orrenius |

* cited by examiner

SOWING ELEMENT EQUIPPED WITH AN OWN PNEUMATIC DEVICE AND PNEUMATIC SINGLE-SEED SOWING MACHINE HAVING AT LEAST ONE SUCH SOWING ELEMENT

BACKGROUND

The present invention relates to the general technical field of agricultural machinery and in particular to agricultural machines used to sow seeds. The invention relates to a pneumatic sowing element provided with a reservoir designed to contain seeds, at least one planting device and at least one distribution box delivering the seeds, one-by-one, via a rotary dosing element, wherein the seeds are distributed pneumatically. The invention also relates to a single-seed sowing machine or precision sowing machine equipped with such sowing elements.

Such a sowing machine of single-seed type with sowing elements and with distribution of the seeds pneumatically is known, for example, from documents WO 2011/056138 or US 2008/0264313 . Each sowing element has a distribution box provided with a rotary dosing element in order to deposit the seeds one-by-one in the sowing line at constant spacing. In the majority of sowing machines of this type, such as the MAXIMA (registered trademark) single-seed sowing machine sold by the KUHN Company, for example, distribution is achieved by means of a perforated disk, onto which the seeds are sucked by vacuum. The vacuum is generated by a centralized pneumatic device that supplies all sowing elements of the sowing machine. The air flow is channeled toward each distribution box via more or less long flexible tubes. Knowing that the drops in pressure are proportional to the length of the tube, the air flow delivered to the outer distribution boxes is weaker than the air flow delivered to the distribution boxes close to the center of the sowing machine. To assure optimum pickup of seeds for the outer distribution boxes, the suction pressure must be set to the upper operating range of the pneumatic device.

From document WO 2011/056138 a sowing machine is known with a centralized pneumatic device such as described in the foregoing, wherein part of the air flow delivered to the different distribution boxes is circulated and another part is used to guide the seeds onto the soil.

From document US 2008/0264313 a single-seed sowing machine is known with a first centralized pneumatic device for assuring distribution of seeds into different auxiliary reservoirs, each associated with a sowing element, and a second centralized pneumatic device in the form of a vacuum source for assisting distribution of the seeds at the level of each sowing element.

From document FR 1229027 a single-seed sowing machine is known with a distributor, wherein the type is not described precisely and a pneumatic device generates compressed air, which is used to achieve entrainment of the seeds and ejection thereof toward the soil.

It is also known during sowing to provide the field with parallel non-sowed tracks, which will serve as references for the treatment and/or fertilization machines. To establish these tracks, one or more distributors of the sowing machine are deactivated to avoid crushing the future plants and in particular to avoid wasted sowing effort. The periodicity of these tracks is a function of the width of the sowing machine and of that of the treatment machines, in such a way as to avoid repeated covering and/or absences of products between two successive passes. The operating speed of the pneumatic device remains identical regardless of the number of deactivated distributors.

BRIEF SUMMARY

The objective of the present invention is to remedy the aforesaid inconveniences. It is intended in particular to provide a single-seed sowing machine with improved performances and with improved energy efficiency.

To this end, the object of the invention is a sowing element of the type mentioned in the introduction of the present description, characterized in that the sowing element is provided on top with an own pneumatic device, which autonomously assures the production of air flow for distribution of seeds. By virtue of this characteristic, each sowing element is autonomous in terms of production of air flow for its distribution box. With an individual pneumatic device per sowing element, the air flow can be decreased when the distributor is deactivated. Advantageously, the air flow can be adjusted depending on the shape, size and weight of the seeds to be sowed and of the speed of rotation of the rotary dosing element. The drop in speed of one of the pneumatic devices makes it possible to reduce the energy required to supply it, in turn resulting in a reduction of fuel consumption.

According to another additional characteristic of the invention, the pneumatic device fits into the overall space of the corresponding sowing element. The dimensions and the position of the pneumatic device permit perfect integration into the available volume of the sowing machine. It does not constitute an obstacle for the adjustments of spacing between two neighboring sowing elements so as to adapt to different crops.

According to another characteristic of the invention, the pneumatic device extends to the proximity of the distribution box. This setup close to the distribution box considerably reduces the length of flexible tubing required and thus also the phenomenon of drop in pressure.

According to an advantageous characteristic of the invention, the pneumatic device is integrated into the cover of the distribution box. With such a characteristic, the flexible tube for channeling the air flow from the pneumatic device to the distribution box is no longer necessary.

In agreement with an advantageous embodiment of the invention, the sowing machine is provided with at least one control box, capable of and designed for controlling the motion for driving the rotary dosing element and/or the speed of operation of the own pneumatic device.

Preferentially, the said at least one control box is capable of adjusting the air flow produced by the own pneumatic device, and of doing so depending on the shape, size and weight of seeds to be sowed and/or depending on the speed of rotation of the rotary dosing element.

In conformity with an alternative embodiment, the sowing element may comprise two distribution boxes and two planting devices, disposed respectively one on each side, preferentially supplied by a single pneumatic device.

The present invention also relates to a pneumatic single-seed sowing machine having a chassis that supports at least one sowing element, wherein this sowing machine is characterized in that it is provided with sowing elements of the type described in the foregoing, specifically at least two elements, advantageously six or more.

Advantageously, each of the sowing elements constitutes an autonomous module capable of being controlled individually or in grouped manner (concomitantly with one, several or all of the other sowing elements of the sowing machine) according to the circumstances, preferentially mounted to be individually interchangeable, and the operating parameters of which can be adapted to the seeds to be sowed and possibly even modified in the course of sowing.

BRIEF DESCRIPTION OF THE DRAWINGS

Other characteristics and advantages of the invention will become apparent from the description hereinafter with reference to the attached drawings, which are provided only by way of non-limitative examples of the invention, wherein.

DETAILED DESCRIPTION

Figure 1:
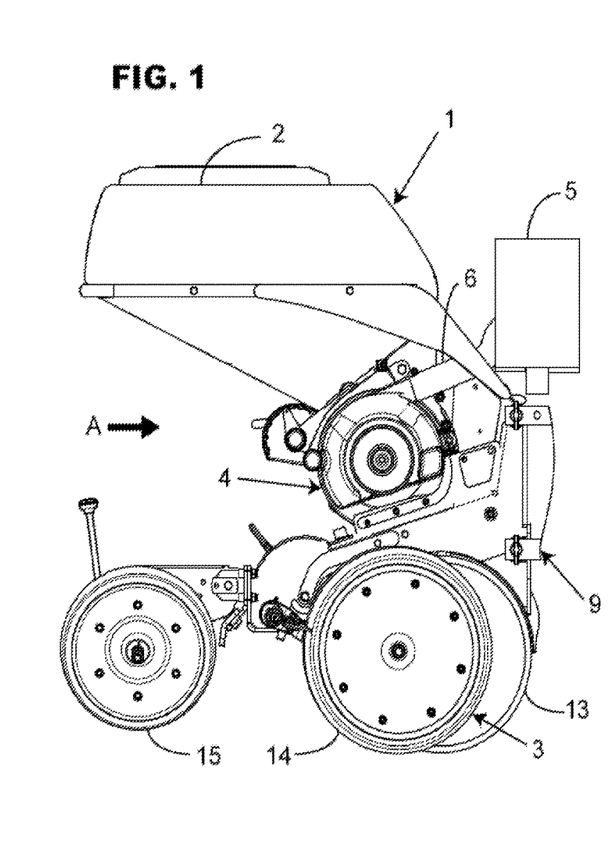
FIG. 1 represents a side view of a sowing element according to the invention.

FIG. 1 shows a sowing element (1) according to the invention in side view. This sowing element (1) is provided with a reservoir (2) designed to contain seeds, at least one planting device (3) and at least one distribution box (4) delivering the seeds by means of a rotary dosing element. The function of sowing element (1) is to distribute the seeds one-by-one to obtain a regular spacing along the line. The distribution of the seeds is assisted pneumatically, in other words the selection of seeds and/or the transport of the selected seeds toward the soil may be assisted by a vacuum or pressure air flow.

According to the invention, sowing element (1) is provided on top with an own pneumatic device (5). By virtue of this characteristic, sowing element (1) is autonomous in terms of production of the air flow for the distribution of seeds. Distribution box (4) of sowing element (1) is supplied directly by corresponding pneumatic device (5). With an own or individual pneumatic device (5), the air flow can be adjusted according to the shape, size and weight of the seeds to be sowed. The air flow is also adjustable depending on the speed of rotation of the rotary dosing element. Such adjustment makes it advantageously possible to optimize the operation of distribution by sowing element (1) and on the other hand to reduce the energy consumption. It will be noted that the dimensions and the position of pneumatic device (5) on sowing element (1) are such that they do not constitute an obstacle for the different adjustments of spacings between two neighboring sowing elements. Pneumatic device (5) fits into the overall space of corresponding sowing element (1). Pneumatic device (5) extends below the top part of reservoir (2) and therefore fits into the overall height of the corresponding sowing element (1).

In the exemplary embodiment represented in FIG. 1, sowing element (1) has its own distribution box (4) with vertical disk, and the selection of seeds is assisted by a vacuum air flow. Distribution box (4) is provided with a casing of general cylindrical shape and a cover. The vertical disk disposed in distribution box (4) separates the supply from the suction chamber. It is planar and turns around an essentially horizontal axis of rotation. The cover constitutes the mobile part containing the suction chamber. FIG. 1 is a side view of sowing element (1) on the cover side of distribution box (4). Particularly advantageously, pneumatic device (5) extends to the proximity of distribution box (4) and provides the vacuum necessary for its operation. Pneumatic device (5) extends substantially above and in front of distribution box (4) viewed in forward direction (A). Pneumatic device (5) is fixed on sowing element (1). The air flow delivered by pneumatic device (5) is channeled into distribution box (4) via a tube (6). Tube (6) is connected to the suction chamber. The proximity of pneumatic device (5) and of distribution box (4) considerably reduces the length of tube (6) connecting them. Tube (6) must be sufficiently long that it is able to access the vertical disk when the cover is open. Tube (6) is preferably flexible. The vertical disk must be considered as the rotary dosing element. It has perforations disposed at regular intervals over a circumference close to its periphery. The seeds are sucked by the vacuum and pressed against the perforations of the vertical disk. When the seed arrives opposite the soil, the vacuum at the level of the perforation is relaxed to release the seed. Thus the seeds are extracted one-by-one in view of spreading them at constant intervals along the row.

In another exemplary embodiment of a pressure distributor, the air under pressure is used to press the seeds one-by-one into the peripheral funnels of a rotating vertical disk. Expulsion at the low point is assisted by an ejector finger. In this case, pneumatic device (5) delivers a flow of air under pressure to assist the selection of seeds. The pressure air flow is also used to transport the seeds to planting device (3).

According to another alternative embodiment, it may be provided that the selection of seeds in distribution box (4) is achieved or assisted by a vacuum air flow and that the transfer of seeds to planting device (3) or to the soil is achieved or assisted by a pressure air flow. Advantageously, the two air flows (pressure and vacuum) are, at the level of sowing element (1, 1') in question, produced by the same pneumatic device (5).

Figure 2A:
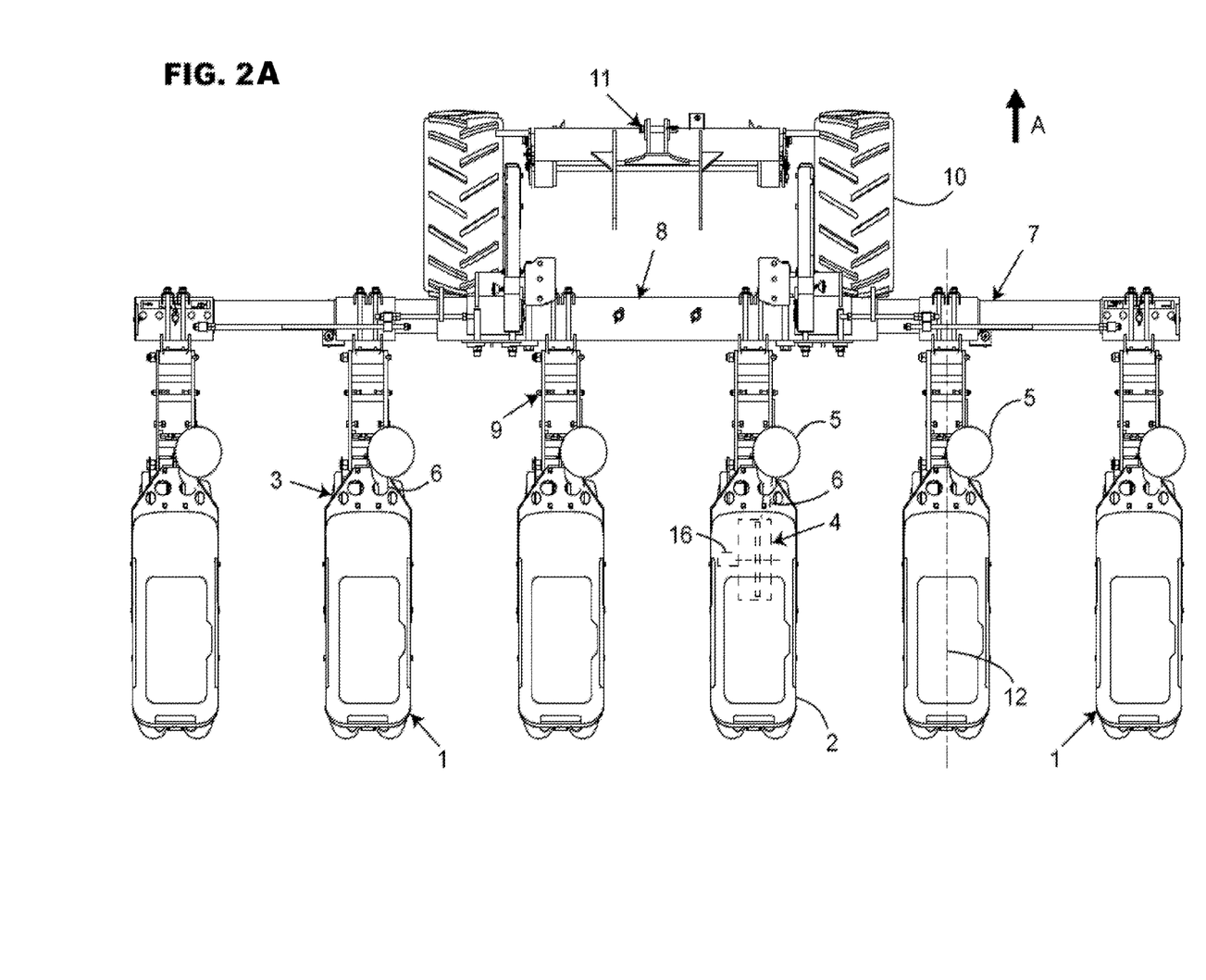
FIG. 2A represents an overhead view of a sowing element according to the invention, equipped with six sowing elements according to FIG. 1.

The agricultural machine represented in FIG. 2A is a pneumatic single-seed sowing machine (7). This figure is an overhead view of a sowing machine (7) with six sowing elements (1), generally one sowing element per row. The six sowing elements (1) are distributed regularly over chassis (8). Such a sowing machine is used for crops necessitating precise deposition of seeds, such as crops comprising beet, corn, sunflower and different legumes. These crops are sowed in lines at distances that can vary from 20 cm to 80 cm. Sowing elements (1) are distributed according to a defined and adjustable spacing. Chassis (8) is telescopic, and so the spacing between sowing elements (1) can be modified rapidly. It is provided with a central beam and two sliding extensions such as described in Patent Application FR 2920266 A1 . Sowing elements (1) represented in FIG. 2A are spaced 75 cm apart for a corn crop. Each sowing element (1) is mounted on a chassis (8) by means of a deformable parallelogram (9), which permits it to be displaced parallel to the soil and to follow the irregularities of the soil. Chassis (8) rests on the soil via support wheels (10). Chassis (8) is provided with a hitch system (11). In this way a tractor is used to displace sowing machine (7) in a forward direction indicated by arrow (A). In the rest of the description, the concepts of "front", "rear" and "in front of", "at the rear of" are defined relative to forward direction (A), and the concepts of "right" and "left" are defined by viewing sowing machine (7) from the rear, in forward direction (A).

According to this FIG. 2A, each of the six seeding elements (1) is equipped with an own pneumatic device (5). Pneumatic device (5) is disposed at the front of reservoir (2) and at the right of median vertical plane (12) of sowing element (1). It extends preferably from the side of the cover of distribution box (4), i.e. from the side of the suction chamber. Pneumatic device (5) fits into the overall width of the corresponding sowing element (1). Pneumatic device (5) extends substantially between median vertical plane (12) of sowing element (1) and a vertical plane passing through the right side wall of reservoir (2). In this way, pneumatic device (5) does not interfere with adjustment of the spacing between the two sowing elements (1) at the minimum value. The range of adjustment of sowing machine (7) is therefore not reduced. Advantageously, pneumatic device (5) of each sowing element (1) has identical characteristics. Pneumatic device (5) is a fan or a turbine. The drive of each pneumatic device (5) is individual. The drive is provided by an electrical or hydraulic source drawn from the tractor or by an autonomous source such as an electric motor or hydraulic motor. When pneumatic device (5) is driven via an autonomous source, variation of the generated air flow is easier and in particular is independent of the engine speed of the tractor. Servo power from an electric motor is more precise and simpler than from a hydraulic motor. With an electric motor, the protection systems for torque limitation are simpler and the operating efficiency is higher. Coupling with the tractor is simpler and practical and in particular is less dirty.

Figure 3A:
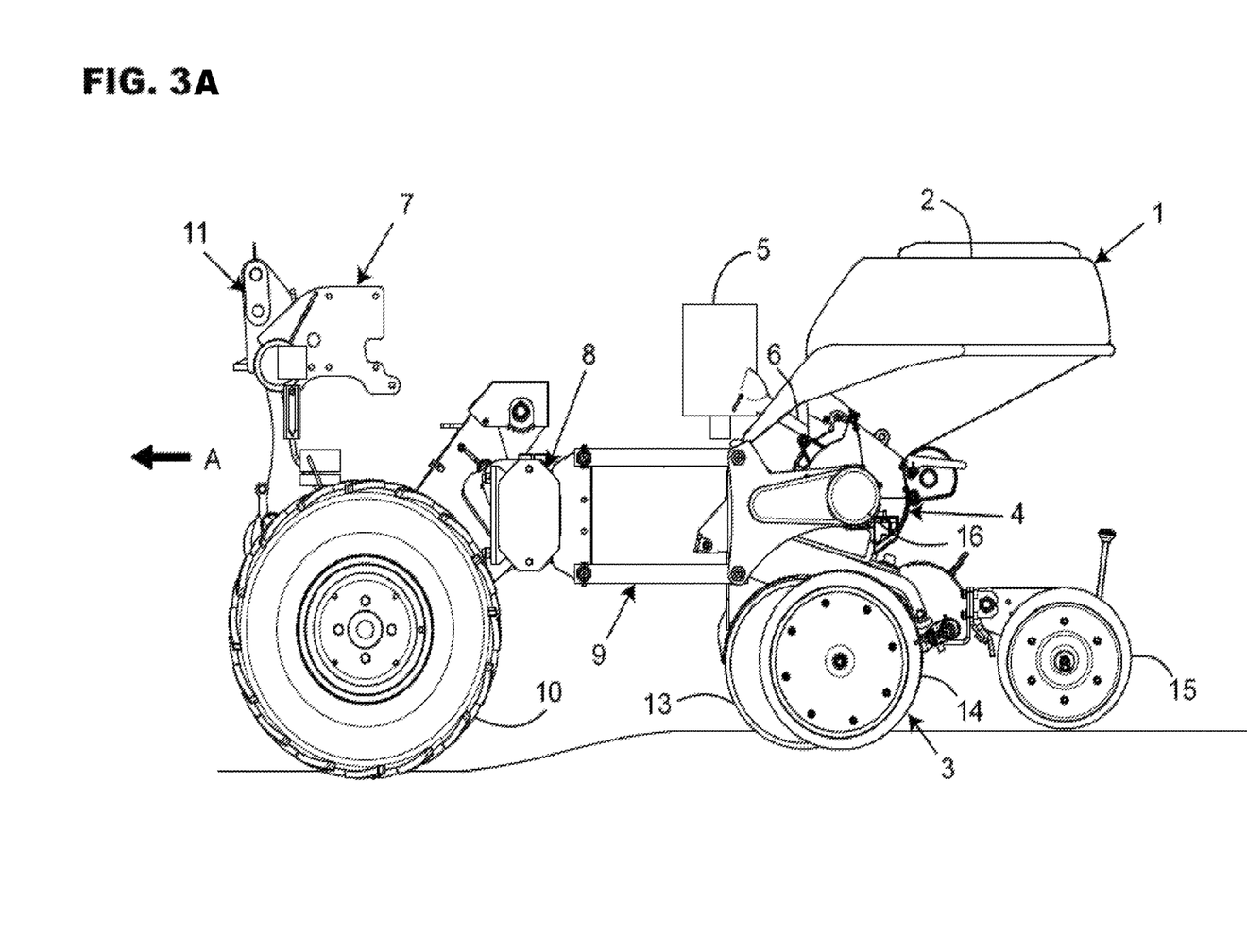
FIGS. 3A and 3B represent side views of a sowing element according to the invention, such as represented in FIG. 2A, a control box being outlined schematically in FIG. 3B.

FIG. 3A is a side view of sowing element (7) with the left outer sowing element represented in a working configuration. Parallelogram (9) connects sowing element (1) with chassis (8). With six sowing elements (1), sowing machine (7) is supported by the tractor by means of three-point hitch system (11). With a larger number of sowing elements (1), support wheels (10) of the sowing machine remain on the soil during transportation. In the represented exemplary embodiment, distribution box (4) is disposed between reservoir (2) and planting device (3). Planting device (3) combines colter means (13), depth-control means (14) and covering means (15). Distribution box (4) is provided with a motor (16) for driving the rotary dosing element in rotation. Motor (16) is represented schematically on the fourth sowing element (1) of FIG. 2A. With such a motor (16), the speed of rotation can therefore be adapted continuously. The motor is electric or hydraulic. In one alternative, driving in rotation may also be achieved by means of a drive system provided with pinions and chains and a gearbox.

According to one alternative, not represented, pneumatic device (5) is disposed at the rear of distribution box (4) as viewed in forward direction (A) and at least partly under reservoir (2). This pneumatic device (5) is lodged in the space between reservoir (2) and covering means (15). With such an arrangement, pneumatic device (5) also fits into the overall height and width of sowing element (1).

In the course of sowing, it is standard practice to interrupt the distribution of seeds on one or more row(s) of the rows in order to mark out a field. Marking out consists of making parallel unseeded tracks in the field to serve as references for post-treatment, i.e. spreading of fertilizer and/or phytosanitary treatments. Thus appropriate distributors, corresponding to the path of the tractor used for post-treatment, are deactivated after a specified number of round trips of the sowing machine (7) across the field. The periodicity of these tracks depends on the width of sowing machine (7) and of that of the treatment machines, in order to avoid repeated covering and/or absence of products between two successive passes. Distribution box (4) of each sowing element (1) can be deactivated or activated such that it does not sow seeds. Thus the future plants will not be crushed during post-treatments, and sowing is economized. Each of the sowing elements (1) is equipped with a device that makes it possible to deactivate and activate the rotation of the rotary dosing element.

Particularly advantageously with an own and individually controlled pneumatic device (5), the air flow can be adapted, reduced or even stopped when the rotary dosing element is no longer being driven in rotation and when the corresponding sowing element (1) is deactivated. At a slower speed of operation, the energy consumption of pneumatic device (5) is reduced, as is the noise. The energy efficiency of the sowing machine will be improved. Sowing element (1), in which the distributor is deactivated, generally remains in its working position, meaning that its planting device (3) is engaged in the soil. Sowing element (1) according to the invention is therefore totally autonomous with regard to the motion of its distribution box (4), both as regards driving the rotary dosing element in rotation and as regards pneumatic assistance for the selection and/or transport of seeds. It will also be possible to reduce or even cut off the air flow during half-turns at the end of the field, since all of the sowing elements (1) are raised from the soil and the distribution of seeds is stopped. In the case of pneumatic distribution by vacuum, to ensure that the selected seeds on the perforations do not fall off, the suction must not be cut off when the distributor on a sowing element (1) is stopped. Thus pneumatic device (5) delivers an air flow with weaker vacuum.

According to an additional advantage, the air flow delivered by each pneumatic device (5) can be different on each row and can thus be adapted to the size and weight of the seed being distributed by sowing element (1). It will be possible to adjust the air flow for holding the seeds on the rotary dosing element individually and precisely. Each pneumatic device (5) is equipped with a pressure indicator such as a vacuum gauge or a manometer. Each sowing element (1) has at least one control box or computer (17). The control box can be electrical and/or electronic and can have the function of controlling the motion for driving the rotary dosing element and for controlling the speed of operation of pneumatic devices (5). In one alternative, sowing element (1) has one control box (17) for moving the distributor and another control box (17) for pneumatic device (5). The different control boxes (17) present on sowing machine (7) are connected to a communications network and/or to a supply network. Thus it will also be possible to monitor information row-by-row. Control boxes (17) are interconnected by a communications network, such as a CAN network, or a faster communications network, such as EtherCAT©. Control boxes (17) are also interconnected by a power supply network. This may be, for example, an electrical or hydraulic power supply network.

Figure 3B:
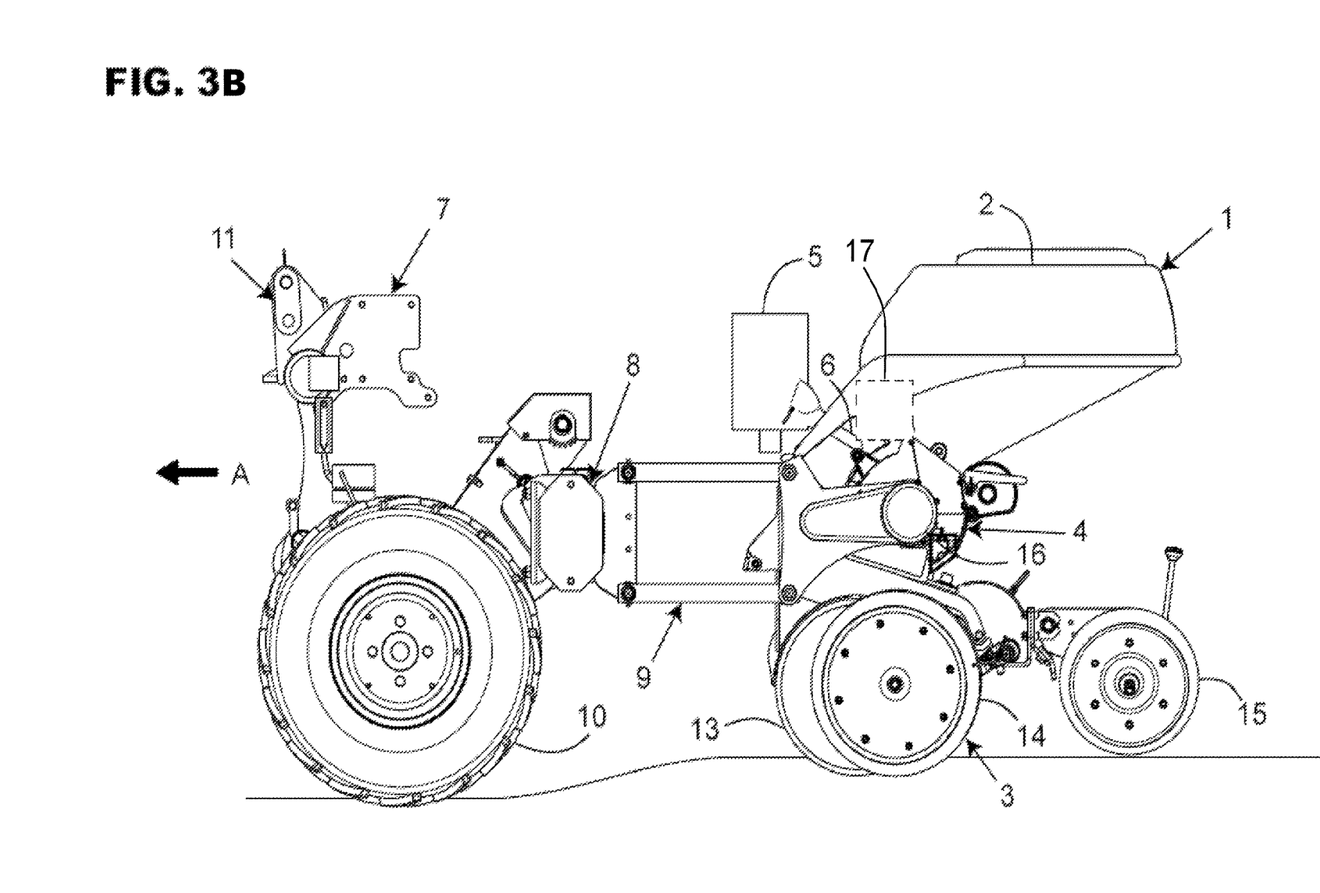

The control box or boxes (17) may be mounted or integrated at different places at the level of sowing elements (1, 1'). FIG. 3B symbolically illustrates one possible location of such a control box (17).

Advantageously, the control of the drive of the rotary dosing elements or that of pneumatic devices (5) is achieved in individual manner. Control may also be achieved for a group or for all sowing elements (1).

To avoid repeated cutting of sowed lines and overlapping of future plants, it is also becoming increasingly more common to interrupt the distribution of seeds when sowing machine (7) enters an already sowed zone. With pneumatic device (5) according to the invention, it will also be possible to adapt, reduce or even stop the air flow produced as described in the foregoing.

Figure 4:
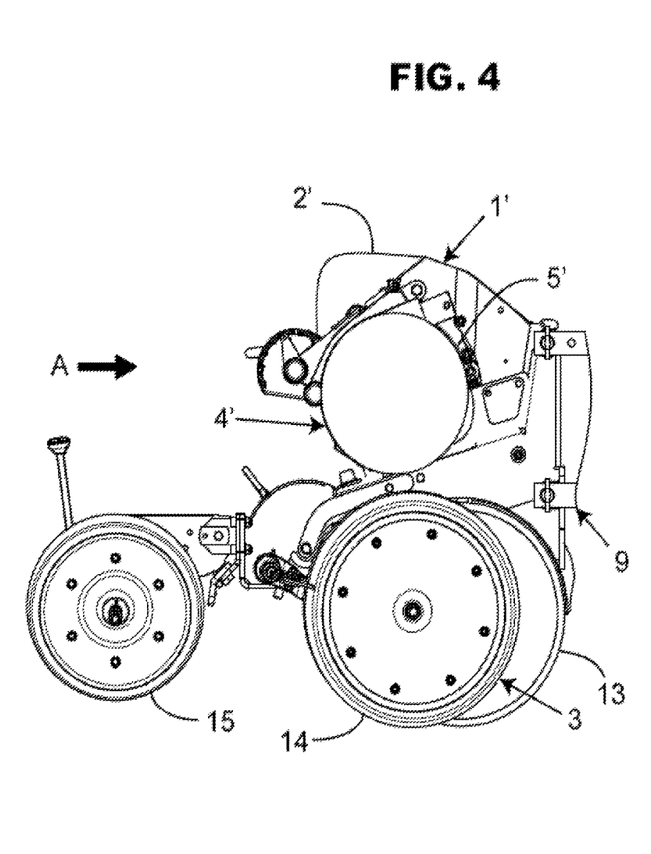
FIG. 4 represents a sowing element according to another exemplary embodiment.

FIG. 4 corresponds to a side view of a sowing element according to another exemplary embodiment. The represented sowing element (1') is identical to that described hereinabove and represented in FIGS. 1 to 3, except as it relates to the capacity of its reservoir (2') and the disposition of its pneumatic device (5'). Sowing element (1') has a reservoir (2') of reduced capacity designed to be supplied remotely. This sowing element (1') is designed to be mounted in combination with a centralized hopper, which supplies all rows. The centralized hopper is fixed on chassis (8) of the sowing machine. Pneumatic device (5) is integrated in distribution box (4'). Advantageously, pneumatic device (5') is integrated in the cover of distribution box (4'). Pneumatic device (5') is directly connected to the suction chamber of distribution box (4'), thus making it possible to obtain a compact structure. With this integration, tube (6) between the pneumatic device and the distribution box is no longer necessary. Furthermore, it will also be noted that pneumatic device (5') fits into the overall height and width of sowing element (1'). It even fits into the overall length of sowing element (1'). Integration of pneumatic device (5') in the cover is entirely possible in combination with a reservoir (2) of normal capacity, such as represented in FIG. 1. In this alternative embodiment also, one or more control boxes can be provided, although they are not represented in FIG. 4.

In another exemplary embodiment, not represented, sowing element (10) is provided with two distribution boxes (4) and two planting devices (3). The two planting devices (3) are also disposed one next to the other. This sowing element (1) is capable of sowing two rows simultaneously with a reduced spacing. The two distribution boxes (4) are disposed one next to the other. The two distribution boxes (4) are preferentially supplied by a single pneumatic device (5). It is also possible to provide a pneumatic device (5) for each of the distribution boxes (4).

Figure 2B:
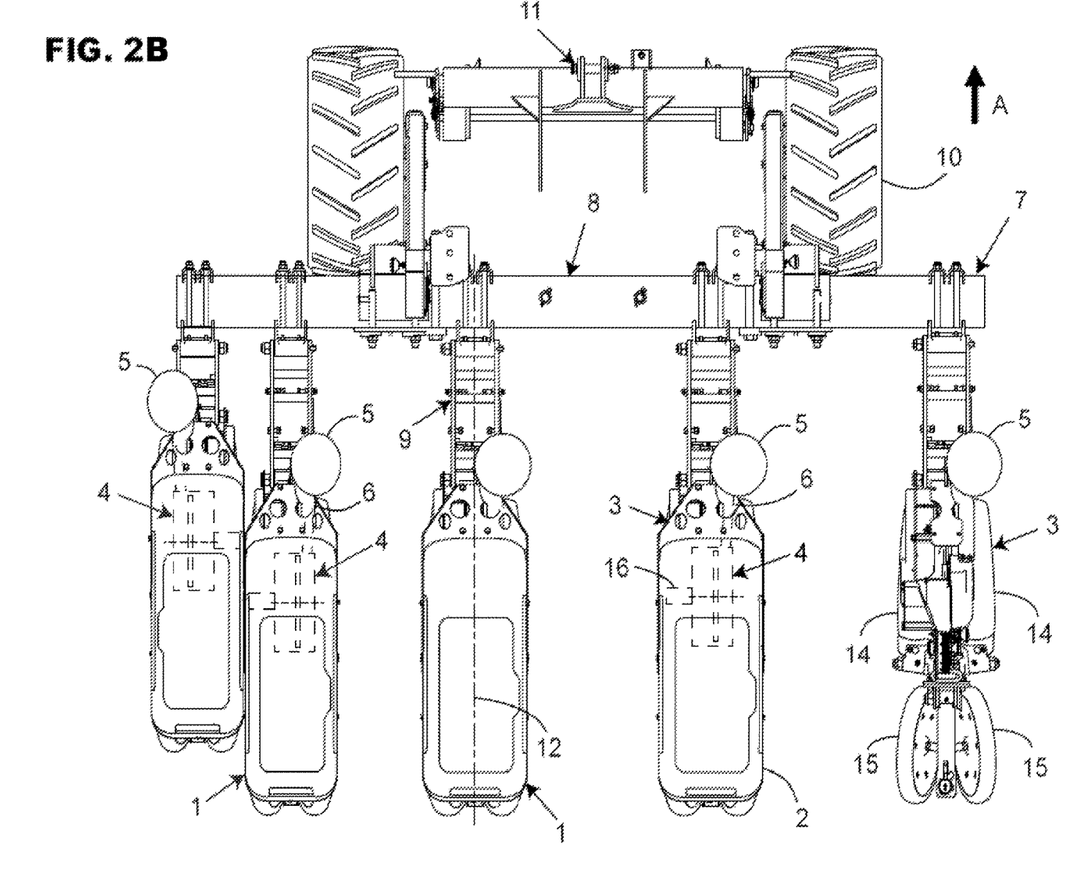
FIG. 2B is an overhead view, similar to that of FIG. 2A, of a sowing element according to the invention, equipped with three sowing elements (one of which is represented without reservoir), positioned in separate manner, and with a pair of adjacently positioned sowing elements.

Thus, and as FIG. 2B shows by way of example, sowing elements (1, 1') may be mounted in the sowing machine or as separate individual units, distributed along the transverse beam of chassis (8), or as units associated in pairs, in which the elements are physically arranged side-by-side, possibly with a slight mutual offset in forward direction A. Such a double sowing element, in which each unit comprises its own reservoir (2), its own distribution box (4), its own planting device (3), its own pneumatic device (5) and preferentially its own control box (17), makes it possible to achieve paired sowing lines , i.e. sowing lines with a small separation distance which, as the case may be, is in particular smaller than the lateral dimension of an individual sowing element.

As follows from the foregoing description and the attached figures, each of the sowing elements (1, 1') constitutes an autonomous module that can be controlled, individually or in grouped manner, at the level of the drive of the rotary dosing element or elements and/or of the speed of operation of the own pneumatic device (5, 5'), by one or two control box(es). Control of sowing elements (1, 1') can be achieved from a local interface of the sowing machine or from an interface at the level of the tractor.

With its own control box or boxes (17), each sowing element (1, 1') constitutes a functional unit that is autonomous from the mechanical, pneumatic or electronic viewpoint and that can be programmed individually and needs only one power supply and global control signals for its operation.

In addition to the adjustment of their mutual spacing, each sowing element (1, 1') can be mounted on chassis (8) with the ability to be interchanged individually, the said sowing machine (7) thus having a modular constitution.

In order to obtain a sowing machine that is versatile and capable of sowing different types of seeds, which may require different sowing conditions, it may be provided, as already explained in the foregoing, that the control of the operation of each sowing element (1, 1'), in particular of its own pneumatic device (5, 5') and/or of its rotary dosing element or elements, is specific and adapted to the shape, size, nature and/or weight of the seeds to be sowed by the sowing element (1, 1') under consideration.

Thus, during a given sowing pass, it is possible to define a sowing line with a first type of seeds and a neighboring sowing line with a second type of seeds placed with a different spacing in the furrow in question.

Finally, according to an additional characteristic, the operation of the own pneumatic device (5, 5') of each autonomous sowing element (1, 1') may be modified during sowing operation, advantageously by means of a control box (17), as a function of the prevailing working conditions. In this way the operation of the sowing machine and that of the sowing elements (1, 1') can be adjusted precisely (individually or in grouped manner), in order to adapt, permanently and in quasi-real time if necessary, to the prevailing working conditions, especially of soil moisture, structure and consistency.

It is quite evident that the invention is not limited to the embodiments described hereinabove and represented in the attached drawings. Modifications are still possible, especially with respect to the constitution or the number of the diverse elements or by substitution of technical equivalents, albeit without going beyond the scope of protection such as defined by the claims hereinafter.

The invention claimed is:

1. A sowing element comprising:
    a parallelogram positioned at a front of the sowing element to connect the sowing element to a hitch of a tractor;
    a reservoir positioned at a rear of the sowing element and configured to contain seeds;
    at least one planting device and at least one distribution box delivering the seeds, one-by-one, via a rotary dosing element, wherein the seeds are distributed pneumatically;
    a pneumatic device fixed directly on the sowing element at a location between the parallelogram and the reservoir in a longitudinal direction of the sowing element, the pneumatic device being an individual pneumatic device corresponding to the sowing element to autonomously assure production of air flow for distribution of seeds without providing air flow for any other sowing elements,
    wherein the pneumatic device fits entirely between a median vertical plane of the sowing element and a vertical plane passing through a right side of the reservoir.

2. The sowing element according to claim 1, wherein the pneumatic device fits into an overall space of the sowing element.

3. The sowing element according to claim 1, wherein the pneumatic device extends to a proximity of the at least one distribution box.

4. The sowing element according to claim 1, wherein the pneumatic device is placed on a side opposite a seed supply of the at least one distribution box.

5. The sowing element according to claim 1, wherein the pneumatic device extends substantially above and substantially in front of the at least one distribution box viewed in a forward direction.

6. The sowing element according to claim 1, wherein the pneumatic device is integrated into a cover of the at least one distribution box.

7. The sowing element according to claim 1, wherein the pneumatic device creates a pressure air flow or a vacuum air flow.

8. The sowing element according to claim 1, wherein the pneumatic device is driven by a hydraulic motor or by an electric motor.

9. The sowing element according to claim 1, further comprising at least one control box, configured to control motion for driving at least one of the rotary dosing element and a speed of operation of the pneumatic device.

10. The sowing element according to claim 9, wherein the at least one control box is configured to adjust the air flow produced by the pneumatic device depending on at least one of a shape, size, and weight of seeds to be sowed and a speed of rotation of the rotary dosing element.

11. The sowing element according to claim 1, comprising two distribution boxes and two planting devices, disposed respectively one next to the other, or supplied by a single pneumatic device.

12. The sowing element according to claim 1, wherein the pneumatic device creates a pressure air flow that achieves or assists transport of seeds toward the planting device or toward soil, wherein selection of seeds in the at least one distribution box is achieved or assisted by a pressure or vacuum air flow and two air flows are produced by the pneumatic device.

13. A pneumatic single-seed sowing machine comprising:
at least two of the sowing element according to claim 1, including a first sowing element and a second sowing element; and
a chassis supporting the at least two of the sowing element,
wherein the pneumatic device corresponding to the first sowing element does not provide air flow for the second sowing element, and the pneumatic device corresponding to the second sowing element does not provide air flow for the first sowing element.

14. The pneumatic single-seed sowing machine according to claim 13, wherein each of the at least two of the sowing element constitutes an autonomous module that can be controlled, individually or in grouped manner, at at least one of a level of drive of the rotary dosing element or elements and a speed of operation of the pneumatic device, by one control box or two control boxes.

15. The pneumatic single-seed sowing machine according to claim 13, wherein each of the at least two of the sowing element is mounted on the chassis with ability to be interchanged individually, the pneumatic single-seed sowing machine thus having a modular constitution.

16. The pneumatic single-seed sowing machine according to claim 13, wherein control of operation of each of the at least two of the sowing element, and of at least one of the pneumatic device and the rotary dosing element or elements of each of the at least two of the sowing element, is specific and adapted to at least one of a shape, size, nature, and weight of seeds to be sowed by the sowing element under consideration.

17. The pneumatic single-seed sowing machine according to claim 13, wherein operation of the respective pneumatic device of each of the at least two of the sowing element is modified during sowing operation, by a control box.

18. The pneumatic single-seed sowing machine according to claim 13, wherein the first sowing element and the second sowing element each include a control box, and the control boxes of the first sowing element and the second sowing element are connected to at least one of a communications network and a power-supply network.

* * * * *